United States Patent
Oh et al.

(10) Patent No.: US 11,646,879 B2
(45) Date of Patent: May 9, 2023

(54) METHOD AND APPARATUS FOR SELECTING DISTRIBUTED CONSENSUS NODE BASED ON PROOF OF NONCE

(71) Applicant: ELECTRONICS AND TELECOMMUNICATIONS RESEARCH INSTITUTE, Daejeon (KR)

(72) Inventors: Jin-Tae Oh, Daejeon (KR); Joon-Young Park, Hanam (KR); Ki-Young Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 251 days.

(21) Appl. No.: 16/431,333

(22) Filed: Jun. 4, 2019

(65) Prior Publication Data

US 2019/0379538 A1    Dec. 12, 2019

(30) Foreign Application Priority Data

Jun. 12, 2018    (KR) .................. 10-2018-0067594
Apr. 30, 2019    (KR) .................. 10-2019-0050365

(51) Int. Cl.
*H04L 9/00*    (2022.01)
*G06F 16/00*    (2019.01)
(Continued)

(52) U.S. Cl.
CPC ........ *H04L 9/0869* (2013.01); *G06F 16/1824* (2019.01); *H04L 9/0643* (2013.01); *H04L 9/3239* (2013.01); *H04L 9/50* (2022.05)

(58) Field of Classification Search
CPC ... H04L 9/0869; H04L 9/3239; H04L 9/0643; H04L 2209/38; H04L 9/0825;
(Continued)

(56) References Cited

U.S. PATENT DOCUMENTS 8,762,729 B2    6/2014    Hwang et al.
8,966,273 B2    2/2015    Hwang et al.
(Continued)

FOREIGN PATENT DOCUMENTS

CN    106445711 A    2/2017
CN    106682907 A    5/2017
(Continued)

OTHER PUBLICATIONS

Emanuel Ferreira JESUS et al. "A Survey of How to Use Blockchain to Secure Internet of Things and the Stalker Attack." Security and Communication Networks, 2018.
(Continued)

*Primary Examiner* — Jorge L Ortiz Criado
*Assistant Examiner* — Kevin Ayala

(57) ABSTRACT

A method for selecting a consensus node in an apparatus for generating a blockchain includes reading a nonce from the nonce chain of a node, performing an operation on the read nonce and previous height information, and comparing the result of the operation with a reference value in order to select the node as a consensus node.

3 Claims, 10 Drawing Sheets

(51) Int. Cl.
  *H04L 9/08* (2006.01)
  *H04L 9/06* (2006.01)
  *G06F 16/182* (2019.01)
  *H04L 9/32* (2006.01)

(58) Field of Classification Search
  CPC ............ G06F 16/1824; G06F 16/9014; G06Q 20/401; G06Q 20/3827
  See application file for complete search history.

(56) References Cited

U.S. PATENT DOCUMENTS

| | | | |
|---|---|---|---|
| 10,824,759 B1* | 11/2020 | Magerkurth | H04L 9/3236 |
| 2017/0075941 A1 | 3/2017 | Finlow-Bates | |
| 2017/0344987 A1 | 11/2017 | Davis | |
| 2018/0048462 A1* | 2/2018 | Salmela | H04W 12/37 |
| 2018/0089683 A1* | 3/2018 | Setty | G06Q 20/065 |
| 2019/0068380 A1 | 2/2019 | Tang | |
| 2019/0182049 A1* | 6/2019 | Juels | H04L 9/3247 |
| 2019/0245703 A1* | 8/2019 | Simplicio Junior, Jr. | H04L 9/3268 |
| 2019/0286532 A1* | 9/2019 | Guo | H04L 9/3239 |
| 2019/0377811 A1* | 12/2019 | Aleksander | H04L 9/3297 |
| 2019/0379538 A1 | 12/2019 | Oh | |
| 2020/0076571 A1* | 3/2020 | Natarajan | G06F 16/2246 |
| 2020/0125979 A1* | 4/2020 | Andreou | G06N 7/005 |
| 2020/0356547 A1* | 11/2020 | Furukawa | G06F 16/2379 |
| 2020/0366495 A1* | 11/2020 | Mahoney | H04L 9/12 |
| 2020/0410491 A1* | 12/2020 | Ronnow | G06Q 20/401 |
| 2021/0135854 A1* | 5/2021 | Karame | H04L 9/06 |

FOREIGN PATENT DOCUMENTS

| | | |
|---|---|---|
| KR | 20170137388 A | 12/2017 |
| KR | 10-2342840 B1 | 12/2021 |
| WO | WO2017095920 A1 | 6/2017 |

OTHER PUBLICATIONS

Tien Tuan Anh Dinh et al., "Untangling Blockchain: A Data Processing View of Blockchain Systems." IEEE transactions on knowledge and data engineering 30., 7, 2018.

* cited by examiner

METHOD AND APPARATUS FOR SELECTING DISTRIBUTED CONSENSUS NODE BASED ON PROOF OF NONCE

CROSS REFERENCE TO RELATED APPLICATIONS

This application claims the benefit of Korean Patent Application No. 10-2018-0067594, filed Jun. 12, 2018, and No. 10-2019-0050365, filed Apr. 30, 2019, which are hereby incorporated by reference in their entirety into this application.

BACKGROUND OF THE INVENTION

1. Technical Field

The present invention relates to a method and apparatus for selecting distributed consensus nodes based on proof of nonce.

2. Description of the Related Art

Blockchain technology is a convergent technology including various technologies, such as P2P networks, security and encryption, distributed computing platforms, and the like. The blockchain technology may be defined as technology for ensuring integrity and reliability in order to maintain a single ledger in a distributed manner in such a way that participants in a transaction (hereinafter, referred to as 'nodes') verify whether the transaction is authentic without a central authority, which is a trusted third party, record transaction details in units of blocks, and share synchronized information therebetween. In the existing centralized system, a third-party central authority exclusively manages a central ledger in order to prevent ledger entries from being falsified, whereby reliability is guaranteed through an indirect and passive manner. In a blockchain, instead of entrusting management of a ledger to a third-party central authority, a ledger is managed in a distributed manner by allowing nodes to participate in the confirmation of a transaction using a consensus algorithm. A consensus algorithm is one of the most important technologies for configuring a blockchain in order to maintain the blockchain between unreliable nodes. The consensus algorithm may provide important characteristics of a blockchain, such as fairness and decentralization for providing all nodes with equal opportunities to generate a block (hereinafter, referred to as 'mining'), security for protecting consensus nodes from attacks and preventing the possibility of tampering with a ledger, and the like.

SUMMARY OF THE INVENTION

An object of the present invention is to provide a distributed consensus node selection method in which nodes to participate in distributed consensus (distributed consensus nodes) are selected in an unpredictable manner such that the selected nodes represent all nodes.

Another object of the present invention is to provide a distributed consensus node selection method through which the number of entities performing distributed consensus may be controlled.

A further object of the present invention is to provide a distributed consensus node selection method in which resources (such as computational capability and the like) owned by a node do not affect the acquisition of permission to participate in distributed consensus.

Yet another object of the present invention is to provide a distributed consensus node selection method for verifying whether a node selected to participate in distributed consensus is eligible to participate in distributed consensus.

Also, the objects to be achieved by the present invention are not limited to the above-mentioned objects, and other objects that have not been mentioned will be clearly understood by those skilled in the art from the following description.

A method for selecting a consensus node in an apparatus for generating a blockchain, according to an embodiment of the present invention may include reading a nonce from the nonce chain of a node; performing an operation on the read nonce and previous height information; and comparing the result of the operation with a reference value in order to select the node as the consensus node.

In an embodiment, the nonce chain may be a hash chain.

In an embodiment, the method may further include generating the nonce chain.

In an embodiment, generating the nonce chain may include generating the nonce chain using a master key that is kept private by the node.

In an embodiment, generating the nonce chain using the master key may include generating a base using the master key; generating a hash chain by repeatedly hashing the base multiple times; and setting a start height from which the hash chain starts to be used.

In an embodiment, the length of the nonce chain may be determined so as to correspond to a period at which a block is periodically generated.

In an embodiment, performing the operation may include hashing the read nonce and the previous height information.

In an embodiment, the previous height information may include the hash value of the header of a previous block.

In an embodiment, the method may further include disclosing the final nonce value of the nonce chain, a start height from which the nonce chain starts being used, and an address of the node to other nodes when the result of the operation is determined to be less than the reference value as the result of comparison.

In an embodiment, the method may further include registering nonce chain information of the other nodes in an elite pool, and the nonce chain information may include the address of a corresponding node, the final nonce value of a corresponding nonce chain, and a start height from which the corresponding nonce chain starts being used.

In an embodiment, the address of the node may include a public key or a value through which the node is identified.

In an embodiment, in order to prevent all nodes, including the node, from predicting whether each of the nodes is selected as a consensus node for a block subsequent to a previous block until the previous block is generated, the consensus node may be selected using information related to the previous block.

In an embodiment, the nonce read from the nonce chain may be used as a nonce of a hash function such that all nodes, including the node, are provided with an opportunity for calculation, through which a node is selected as the consensus node, only once for each height.

In an embodiment, when the number of nodes that are able to participate in distributed consensus is n, when the minimum number of nodes required for the distributed consensus is x, and when the cumulative probability that the number of selected nodes is equal to or less than the minimum number is k, the number of distributed consensus nodes may be controlled by variables n, x and k.

In an embodiment, k, which is the cumulative probability, may have a binomial distribution characteristic.

In an embodiment, the probability that the node is selected as the consensus node may be $P_{x,k}$, which is a probability value acquired by conducting a Bernoulli trial based on the variables n, x and k.

In an embodiment, the method may further include changing the reference value when the number of nodes registered in the elite pool of the node is changed.

In an embodiment, the reference value may be calculated by multiplying the probability value, $p_{x,k}$, by the result of the operation.

In an embodiment, the opportunity to determine whether the node is selected as the consensus node may be limited to once for each height.

In an embodiment, the opportunity to determine whether the node is selected as the consensus node may be limited so as to be equal to or greater than once and equal to or less than m times.

A method for verifying a consensus node in an apparatus for generating a blockchain, according to an embodiment of the present invention may include receiving a nonce value, a height of a new block, and an address of a first node from the first node that is selected as the consensus node; retrieving a final nonce value and a start height, corresponding to the address of the first node, from an elite pool of a second node; subtracting the start height from the height of the new block; hashing the nonce value from the new block as many times as a result of subtraction; and comparing a result of hashing with the nonce value received from the first node in order to verify whether the first node is eligible to serve as the consensus node.

In an embodiment, when the result of hashing is equal to the final nonce value, the block generation permission of the first node may be verified.

In an embodiment, when the result of hashing is not equal to the final nonce value, the first node may be demoted when generating a block or using the blockchain.

A method for updating a nonce chain in an apparatus for generating a blockchain, according to an embodiment of the present invention may include recording the base hash value of a nonce chain in a ledger in order to enable, in a future, checking whether or not there is a problem in a process of selecting a consensus node; calculating a new base hash value using the master key of a node; generating a new nonce chain using the new base hash value; and disclosing the final nonce value and the start height of the new nonce chain to other nodes.

In an embodiment, when all of the values of the nonce chain are exhausted, the new nonce chain may be generated.

In an embodiment, the new nonce chain may be forcibly generated when the node succeeds in block generation.

A method for verifying aliveness of a node in an apparatus for generating a blockchain, according to an embodiment of the present invention may include counting the number of distributed consensus nodes; and determining whether the counted number is less than a determined value. Here, each of the distributed consensus nodes may be selected using a nonce chain.

In an embodiment, the determined value may be related to a mean of the distribution of the probability that a node is selected as a candidate to generate a block.

In an embodiment, the mean may be set depending on the number of nodes registered in an elite pool, the minimum number of nodes required for distributed consensus, and the cumulative probability that the number of selected nodes is equal to or less than the minimum number.

In an embodiment, the cumulative probability may be a success probability from Bernoulli trials.

A distributed computing system that generates a blockchain according to an embodiment of the present invention may include at least one first node for generating a nonce chain based on a hash chain and disclosing a start height, a nonce value of the nonce chain, and nonce chain information including the address of a node, to other nodes; and at least one second node for verifying whether the at least one first node is eligible to serve as a consensus node using the nonce chain information, the nonce value received from the at least one first node, and a height.

In an embodiment, when the at least one first node succeeds in block generation, the nonce chain may be updated.

In an embodiment, the at least one second node may include an elite pool in which the nonce chain information is registered.

In an embodiment, the at least one first node may be dropped out of the elite pool, thereby withdrawing from a subject of the consensus.

In an embodiment, in order to register the at least one first node in the elite pool, a transaction record of the blockchain may be used.

An apparatus for generating a blockchain according to an embodiment of the present invention may include at least one processor; and memory for storing at least one instruction executed by the at least one processor. The at least one instruction may be executed by the at least one processor such that a nonce is read from the nonce chain of a node, such that an operation is performed on the read nonce and previous height information, and such that the result of the operation is compared with a reference value in order to select the node as a consensus node.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
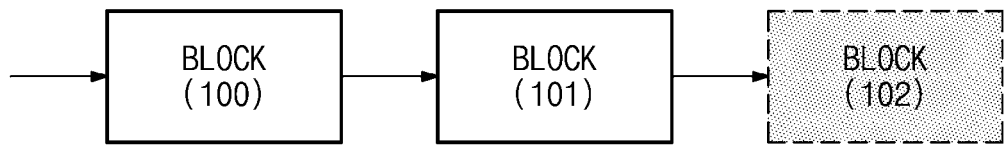
FIG. 1 is an exemplary view that shows a blockchain according to an embodiment of the present invention.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms. These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, terms used herein are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Generally, a blockchain is configured such that each node serves to generate a block and disclose information about the block to other nodes or to verify the validity of a block generated by another node in a distributed environment. In this process, all of the nodes are required to identically record details of a transaction between nodes and content for generating or verifying a block. Here, the protocol that is used in order for all of the nodes participating in a blockchain to maintain the same information therebetween is a distributed consensus algorithm. That is, the distributed consensus algorithm serves to maintain the consistent state of a system by solving inconsistency, which may be caused when multiple subjects cooperate in a distributed environment. Here, the entities performing distributed consensus are nodes that obtain permission to participate in a distributed consensus process for suggesting a new block and adding the same to a blockchain.

As a representative consensus algorithm used in a blockchain, there is a Proof-of-Work (PoW)-based algorithm. PoW-based algorithms, such as Nakamoto consensus in Bitcoin, Ethash in Ethereum, and the like, are currently used in major blockchains, but are problematic in that a mining pool, which is formed in order to control a large share of computing power, may result in centralization and unnecessary power consumption. As alternatives to PoW, Proof-of-Stake (PoS), Delegated PoS (DPoS), PoW+PBFT (Practical Byzantine Fault Tolerance), and the like have been proposed, but various problems, such as centralization, excessive communication costs, vulnerability to an attack on a specific target, and the like, are still present.

Generally, in the case of PoW and PoS, all nodes are entities performing distributed consensus. In the case of PoW, because all nodes perform meaningless operation for finding a nonce in order to generate a block, power consumed therefor may cause an economic problem and an environmental problem. Also, centralization may be caused when some nodes pool their computing power together, and PoW cannot be applied to an application requiring a fast transaction time due to limited scalability. PoS has been proposed in order to solve the power consumption problem with PoW, but is problematic in that excessive traffic may result because all nodes participate in distributed consensus.

DPoS and Tendermint entrust distributed consensus to some fixed nodes in order to solve the problems with PoW and PoS, which are caused because all nodes participate in distributed consensus. Accordingly, DPoS and Tendermint may reduce the time and costs taken for consensus and improve performance because a smaller number of nodes participates in distributed consensus. However, DPoS and Tendermint fix the nodes to be entrusted with distributed consensus, which violates the decentralization concept of blockchain. Also, because authority is concentrated in only a small number of nodes, the reliability of nodes selected by voting is relatively important. Furthermore, when the nodes come together, they become vulnerable to security issues. That is, because the range of attack targets is reduced, the nodes may be easily exposed to the risk of a Denial-of-Service (DoS) attack or the like.

When all nodes participate in consensus, the conventional distributed consensus algorithms are inappropriate to apply to an application that requires fast processing because excessive resources are consumed and it takes a long time to reach agreement. When consensus is entrusted to some nodes in the conventional distributed consensus algorithms, a smaller amount of resources is consumed than the case in which all nodes participate in the consensus, and the time taken to reach agreement may be reduced. However, because the trusted nodes are fixed, the nodes may be easily exposed to attacks, such as a DoS attack or the like, and there may be a security problem attributable to collusion between the trusted nodes.

In order to solve the above-described problems with the conventional distributed consensus algorithms, a distributed consensus algorithm based on Proof of Nonce (PoN) according to an embodiment of the present invention has the following characteristics.

First, the distributed consensus algorithm based on PoN may provide all nodes with equal opportunities to participate in mining a block regardless of the resources and shares owned by each node in order to achieve decentralization, and may guarantee transparency, representativeness, and optimization (minimization of computing power and communication costs) in a consensus process.

Secondly, the distributed consensus algorithm based on PoN is tolerable against an attack on a blockchain and makes it impossible to predict and attack the nodes to participate in consensus, thereby providing security.

Thirdly, the distributed consensus algorithm based on PoN may prevent forgery by providing finalization, and may satisfy various performance requirements required by various industries and applications, such as transactions per second (TPS), block sizes, block generation time, and the like.

In order to achieve the above-described characteristics, the consensus algorithm based on PoN satisfies two conditions. The first condition is that the node that obtains permission to generate a block must be unpredictable. The second condition is that a generated block cannot be altered. The first condition is necessary in order to prevent an attack caused due to collusion between nodes. In the case of a public blockchain in which none of the nodes can be trusted, when a node to generate a block is known in advance, the possibility of an attack thereon is increased, and it is necessary to prevent this. Also, it is necessary to verify whether a node selected to generate a block is eligible to generate a block. The second condition is for preventing a block, the state of which is agreed upon, from being altered.

FIG. 1 is an exemplary view that shows a blockchain according to an embodiment of the present invention. Referring to FIG. 1, block 101 has been generated. Here, in order to generate block 102, the node to participate in generation of block 102 may be randomly selected. To this end, a single value may be calculated by hashing the hash value of block 101 and a random value generated in each node, and the calculated value may be compared with any reference value. Here, in order to enable all nodes to check whether the node participating in block generation legitimately generates the hash result, all nodes know the random value generated by the node participating in block generation.

However, when the random value generated by the node participating in block generation is disclosed, two problems may be caused. Firstly, because the node to participate in block generation can be predicted in advance based on the disclosed random value, an attack based on collusion between nodes becomes possible. Also, when the random value used by the node participating in block generation is known, a malicious node may use the random value of the specific node. In order to solve these problems, it must be possible for other nodes to verify that the random value used by the node is actually owned by the corresponding node, and the identity of nodes to participate in generation of a new block must be unpredictable by other nodes. To this end, a nonce chain for a distributed consensus algorithm based on Proof of Nonce (PoN) may be configured as follows.

Figure 2:
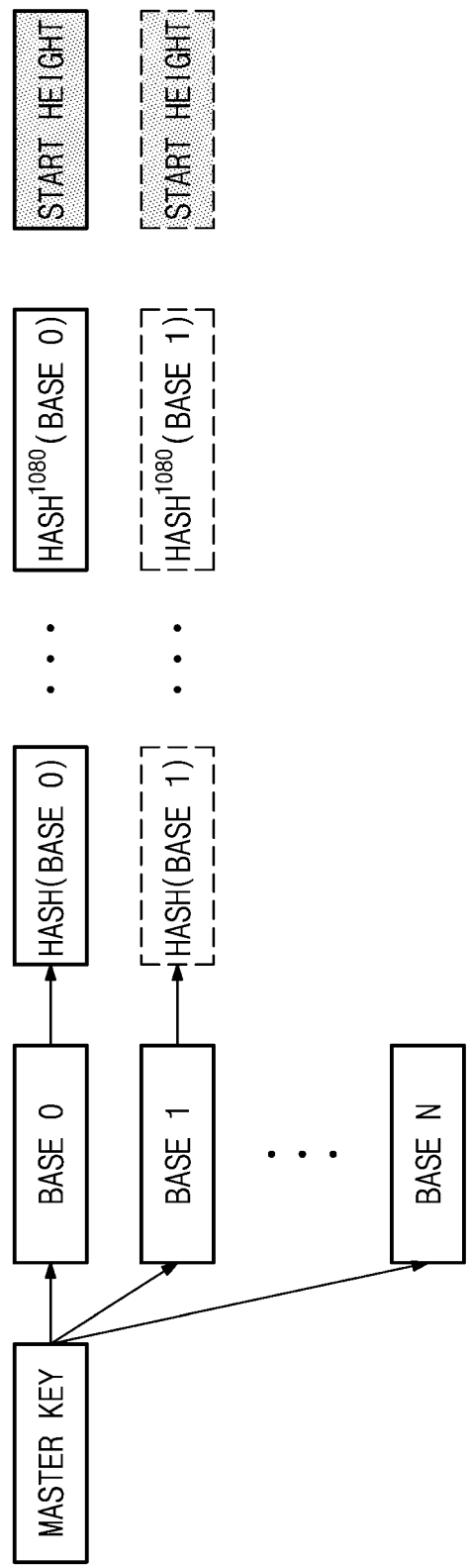
FIG. 2 is an exemplary view that shows a nonce chain for a distributed consensus algorithm based on proof of nonce (PoN) according to an embodiment of the present invention.

FIG. 2 is an exemplary view that shows a nonce chain for a distributed consensus algorithm based on PoN according to an embodiment of the present invention. Referring to FIG. 2, a master key is a nonce that is kept private by each node, base n is a private nonce generated using the master key, and a nonce chain n may include a nonce chain, which is generated by repeatedly hashing base n m times, and a start height, from which the nonce chain starts to be used.

For example, if a block is generated every ten seconds, 1080 nonce values are required for three hours. Accordingly, a nonce chain to be used for three hours may be generated by repeatedly calculating a hash 1080 times. Meanwhile, the length of the nonce chain shown in FIG. 2 is 1080, but it should be understood that this is merely an embodiment of the present invention.

Figure 3:
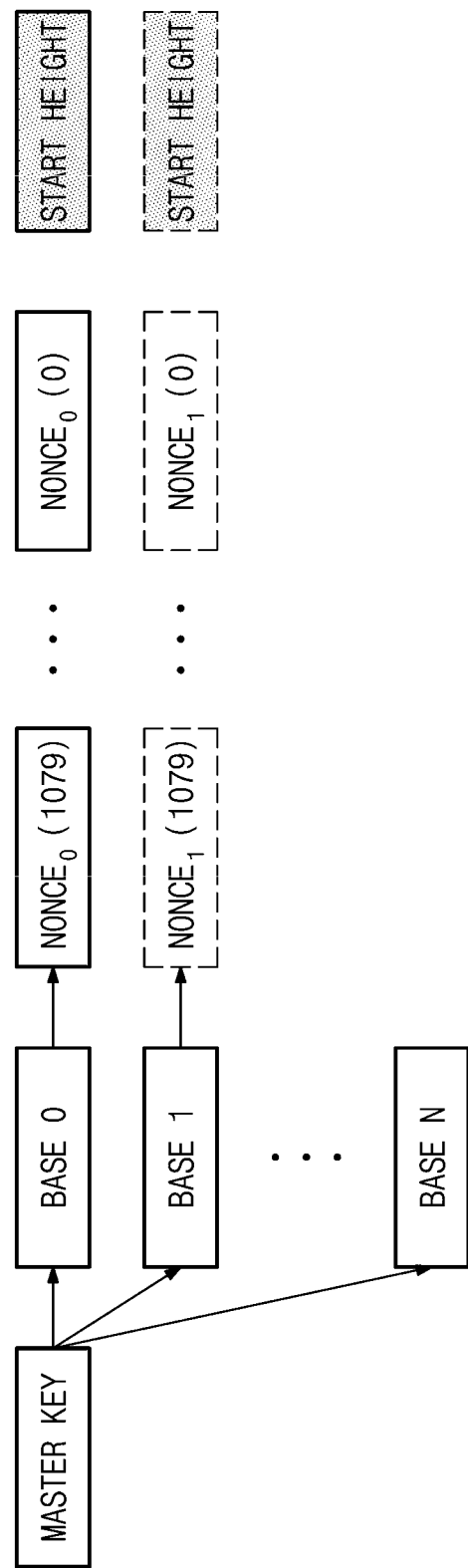
FIG. 3 is an exemplary view for explaining a method for using a nonce chain according to an embodiment of the present invention.

FIG. 3 is an exemplary view for explaining a method for using a nonce chain according to an embodiment of the present invention. Referring to FIG. 3, a node may keep a master key private and generate a base hash value from a nonce.

In an embodiment, a nonce chain may include at least one base chain. In an embodiment, a base chain may be maintained such that the next base chain is unpredictable therefrom. Here, if a block is generated every ten seconds, 1080 blocks may be generated in three hours.

In an embodiment, each hash value added to a nonce chain may be used for only a single block's height. When a base hash value is generated from a master key, the base hash value is hashed, whereby the hash value to be linked to the base hash value is calculated. The calculated hash value is hashed again, whereby the next hash value to be linked thereto is calculated. Such calculation of a hash value may be repeated 1080 times.

Meanwhile, a nonce chain having a length of 1080 should be understood as merely an embodiment of the present invention for the convenience of description.

The nonce chain generated as described above has a structure in which, from a base hash value, the most recent value added to the nonce chain is hashed, and the hashed value is added to the nonce chain again. Because of the characteristics of a hash, it is easy to compute the hash in the forward direction, but it is very difficult to compute the inverse. The final hash value of the nonce chain having a length of 1080, which is HASH(0), and the height of a block for which the nonce chain is to be used, that is, the start height of the nonce chain, may be disclosed to all elite nodes. Then, the value corresponding to the difference between the height of the current block and the start height is retrieved from the nonce chain, and the retrieved value and the hash value of the previous block are hashed together, whereby whether a node is to participate in consensus may be determined.

For example, assume that a certain node generates a new nonce chain and that the nonce chain is disclosed to be used from a block, the height of which is 100. When it is necessary to select nodes to participate in the generation of a new block, the height of which will be 102, because the height of the new block is 102 and the start height of the nonce chain of the certain node is 100, the difference between the two values (the height of the new block—the start height) becomes 2. Therefore, HASH(2) is retrieved from the nonce chain of the node, and the retrieved value and the hash value of block 101 are hashed, whereby a nonce is calculated. Then, when the result of comparison of a portion of the calculated nonce with a reference value is determined to be TRUE, the certain node may participate in block generation. Here, the certain node may verify that it legitimately participates in block generation by disclosing HASH(2).

Also, in order to verify the legitimacy of the certain node, other nodes repeatedly calculate the hash value of HASH(2), which is disclosed by the certain node participating in block generation, as many times as the difference between the height of the block and the start height, and may then check whether the calculated hash result is equal to HASH(0), which was disclosed in advance by the node participating in block generation. Also, the validity of hash(height of block—start height) to be used for the block having the corresponding height may be verified through repeated hashing and comparison with the final hash value, HASH(0), which is already disclosed by the node. Accordingly, each node may be limited to find the single hash value available for the corresponding height.

Because individual nodes are not able to predict the hash values of nonce chains of other nodes, it is impossible to predict nodes that can participate in block generation through collusion between nodes. Also, when a node is determined to participate in block generation through calculation, the node discloses the nonce chain value thereof, thereby verifying that it has a valid hash value.

When a nonce chain is completely consumed, the base hash value of the nonce chain is recorded in a ledger, whereby whether or not the result of selection of nodes made so far is problematic may be checked later. Then, with regard to a new nonce chain to be used next, the final hash value (HASH(0)) of the new nonce chain, which is generated from a new base hash value, and the start height of the new nonce chain may be disclosed.

Here, the node that succeeds in block generation may generate a new nonce chain by changing the base hash to be used next, and may disclose the final hash value and the start height of the new nonce chain. If all nodes simultaneously attempt to update a nonce chain, network congestion and overload of nodes for processing update may be caused. Therefore, only the node that succeeds in block generation forcibly updates a nonce chain, whereby the congestion problem may be solved.

Meanwhile, a method for selecting a candidate to generate a block in a blockchain consensus algorithm is as follows.

In order to determine the node to generate a block, the hash value of a previous block and a value retrieved from the nonce chain of the node are hashed, whereby a single random value may be generated. This random value has a uniform distribution characteristic, and a portion thereof also has a uniform distribution characteristic. In the following example, assume that calculation is made using only a portion of the random value for the convenience of calculation. When a nonce chain is used, each of n nodes may have only a single random value. When the single random value owned by each node satisfies a condition as the result of comparison thereof with a specific reference value, qualification for a candidate to generate a block may be assigned to the node. Conversely, when the condition is not satisfied, the node may be disqualified from being a candidate to generate a block. Assuming that success in acquiring qualification is '1' and failure of acquisition of qualification is '0', a Bernoulli trial, in which a success probability is p, may be conducted.

When a Bernoulli trial in which a success probability is p is repeatedly conducted n times, the distribution of the number of times (x) that the outcome is success may be a binomial distribution. Here, the mean and variance of the binomial distribution may be represented as shown in the following equations.

$$\mu = np \quad (1)$$

$$\sigma^2 = np(1-p) \quad (2)$$

Here, when the number of trials, n, is sufficiently large (i.e. n is equal to or greater than 30), this probability distribution converges to a normal distribution, of which the mean and the variance are np and np(1−p), respectively, through a central limit theorem. When the mean is μ and when the standard deviation is σ, the probability density function of the normal distribution is represented as shown in the following equation.

$$f_x(x) = \frac{1}{\sqrt{2\pi}\,\sigma} e^{\left(-\frac{(x-\mu)^2}{2\sigma^2}\right)} \quad (3)$$

$$F_x(x) = \frac{1}{\sqrt{2\pi}\,\sigma} \int_{-\infty}^{x} e^{\left(-\frac{(t-\mu)^2}{2\sigma^2}\right)} dt \quad (4)$$

$$F_x(x) = \frac{1}{2}\left(1 + \text{erf}\frac{x-\mu}{\sigma\sqrt{2}}\right) \quad (5)$$

Here, it is assumed that a node is selected when a condition is satisfied as the result of comparison of a portion of the output of a hash function, which is calculated by taking the hash value of a previous block and a hash value retrieved from a nonce chain as input, with a specific reference value. Here, if the specific reference value is identically used for all of the nodes, 'μ' in Equation (1) is the mean of the selected nodes.

In Equation (5), when x is 0, the output becomes the probability that no node is selected, and when x is 10, the output becomes the probability that ten or fewer nodes are selected. When Equation (1) and Equation (2) are solved for p and 6, respectively, and are put into Equation (5), the following equation is acquired.

$$F_x(x) = \frac{1}{2}\left(1 + \text{erf}\frac{x-\mu}{\sqrt{\mu\left(1-\frac{\mu}{n}\right)}\sqrt{2}}\right) \quad (6)$$

If F(x), which is the probability that x or fewer nodes are selected, in Equation (6) is fixed to a constant, k, the following equation may be acquired.

$$k = \frac{1}{2}\left(1 + \text{erf}\frac{x-\mu}{\sqrt{\mu\left(1-\frac{\mu}{n}\right)}\sqrt{2}}\right) \quad (7)$$

In Equation (6), x becomes a constant by the condition in which x or fewer nodes are selected. Accordingly, Equation (7) may become a quadratic equation for μ, as shown below.

$$\left(\frac{2(\text{erf}^{-1}(2k-1))^2}{n} + 1\right)\mu^2 - 2\left(x + (\text{erf}^{-1}(2k-1))^2\right)\mu + x^2 = 0 \quad (8)$$

When $(\text{erf}^1(2k-1))^2 = a$ is substituted into Equation (8), the following equation is acquired.

$$\left(\frac{2a}{n} + 1\right)\mu^2 - 2(x+a)\mu + x^2 = 0 \quad (9)$$

When Equation (9) is solved, the solution is as follows.

$$\mu = \frac{x+a+\sqrt{(x+a)^2-\left(\frac{2a}{n}+1\right)x^2}}{\frac{2a}{n}+1} \quad (10)$$

Here, k is calculated as follows. If a block is generated every ten seconds, the number of blocks generated in one year becomes 6×60×24×365. Therefore, the reciprocal of the number of blocks generated in years must be equal to the probability k that x or fewer nodes are selected in years. Accordingly, k may be represented as shown in Equation (11).

$$k = \frac{1}{\text{years} \times 6 \times 60 \times 24 \times 365} \quad (11)$$

For example, when the period in which x or fewer nodes are to be selected is set to one million years, $10^6$ is substituted for 'years' in Equation (11), whereby k is calculated. When x and k are set, the mean $\mu$ is set using Equation (10).

When calculation is made using Equation (8), if the number of all nodes is equal to or less than one billion, the value of $\mu$ that enables ten or fewer nodes to be selected only once in one million years becomes 70.32.

Figure 4:
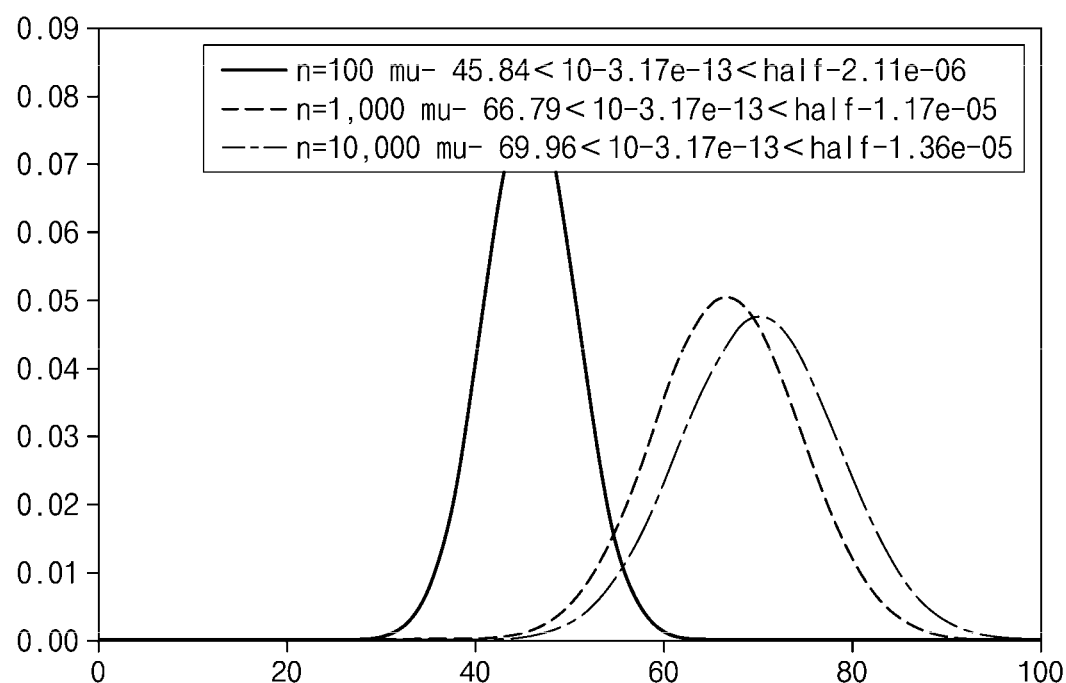
FIG. 4 is an exemplary view that shows the result of simulation of selection of average nodes based on the number of all nodes in a distributed consensus algorithm based on PoN according to an embodiment of the present invention.

FIG. 4 is an exemplary view that shows the result of simulation of selection of average nodes, among all nodes, in a distributed consensus algorithm based on PoN according to an embodiment of the present invention. Referring to FIG. 4, '<10' means the probability that ten or fewer nodes are selected. When the value is about 3.17e-13, ten or fewer nodes are selected once in one million years. Also, the probability that seven or fewer nodes are selected becomes 0.

When n and $\mu$ are set, the probability that a node is selected is calculated as shown in Equation (12). The specific reference value used for all nodes becomes ($\mu$/n) multiplied by the maximum value that can be represented by a portion of the calculated hash value (for example, when 32 bits are used, the maximum value becomes 232). Therefore, the reference value, 'DIFFICULTY', is represented as shown in Equation (13).

$$p_{x,k} = \frac{x+a+\sqrt{(x+a)^2-\left(\frac{2a}{n}+1\right)x^2}}{2a+n} \quad (12)$$

$$\text{DIFFICULTY} = p_{x,k} \times \text{MAX}_{slice} \quad (13)$$

Also, referring to a cumulative distribution function and FIG. 4, 'half' is the probability that the number of selected nodes is equal to or less than ½ of the mean. This probability may be used to predict the partitioning of a network or deactivation of nodes based on the number of selected nodes during the operation of the algorithm.

As shown in FIG. 4, when '<half', which is the probability that the number of selected nodes is only half of the number of nodes that have to be selected, is 1.38e-5, it means that it rarely happens. Accordingly, when the number of selected nodes is less than a certain reference value (e.g., half of the mean or the like) or when such an event repeatedly happens, the aliveness of nodes may be checked.

Meanwhile, the characteristics of a distributed consensus algorithm based on PoN are as follows. Probabilistically, nodes may be provided with equal mining opportunities regardless of resources and shares owned by the nodes. None of the nodes may predict which node is to acquire the mining opportunity. Whether the node mining a block is a valid node may be verified by other nodes. A consensual block cannot be altered. Probabilistically, at least N mining nodes may be ensured so as to represent all of the nodes even though not all of the nodes participate therein. Because it is impossible to predict entities performing distributed consensus, an attack thereon may be prevented.

Figure 5:
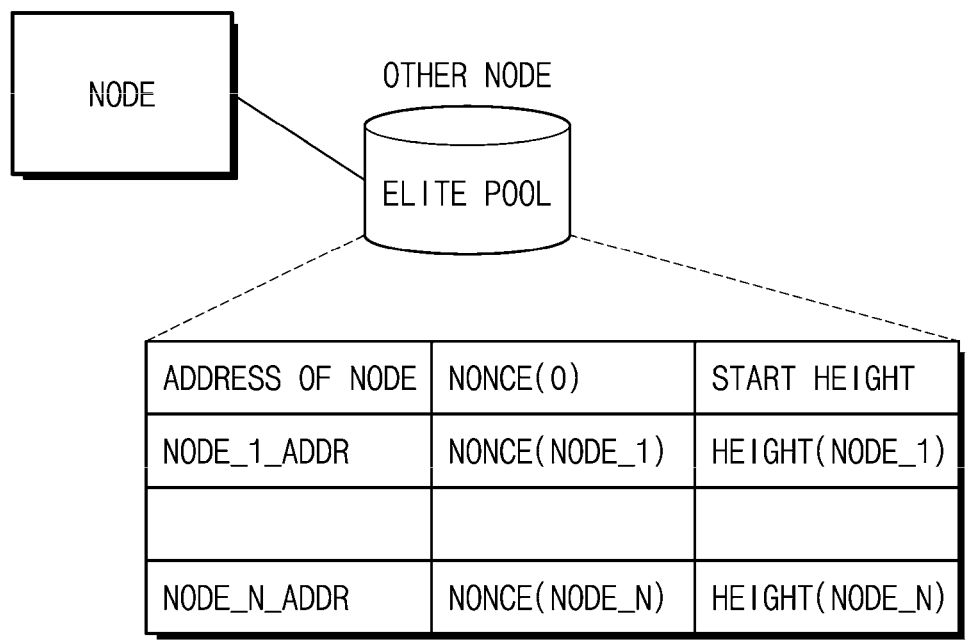
FIG. 5 is an exemplary view that shows the structure of an elite pool of a node in a consensus node selection algorithm based on PoN according to an embodiment of the present invention.

FIG. 5 is an exemplary view that shows the structure of an elite pool of a node in a consensus node selection algorithm based on PoN according to an embodiment of the present invention. Referring to FIG. 5, in order to participate in distributed consensus, a node is required to register nonce chain information in the elite pool of another node. When the nonce chain information of a certain node is registered in the elite pool of another node, the node may become an entity performing distributed consensus.

In an embodiment, the nonce chain information may include the address of the node, the value of NONCE(0), which is the final hash value of the nonce chain, and a start height. In an embodiment, the nonce chain registered by the node may be used from a height corresponding to (START HEIGHT+1). In an embodiment, the address of the node, included in the nonce chain information, may include the public key of the node or a value through which the node may be identified. In an embodiment, registration of a nonce chain may be disclosed to another node using an unused transaction record of the blockchain.

Figure 6:
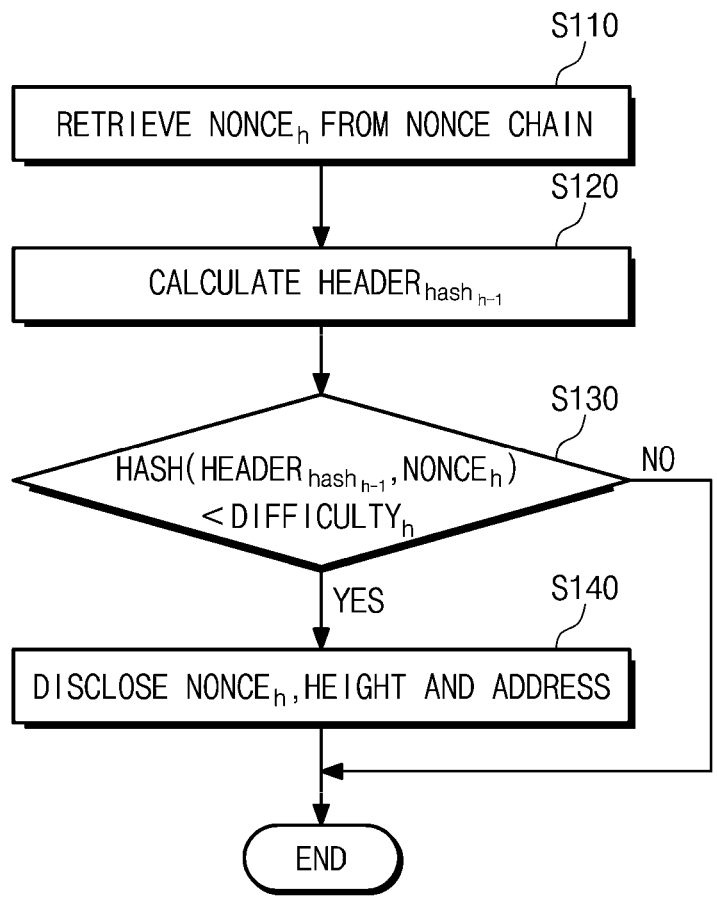
FIG. 6 is an exemplary view that shows a method for checking whether a node has permission to generate a new block according to an embodiment of the present invention.

FIG. 6 is an exemplary view that shows a method for checking whether a node has permission to generate a new block according to an embodiment of the present invention. Referring to FIG. 6, in order to check whether permission to generate a new block to be added to a blockchain has been obtained, each node may perform the following process.

Each node retrieves a nonce(index) from its nonce chain, in which case the index is acquired by subtracting the start height registered by the node from the height of a new block. Here, the retrieved value may become $\text{NONCE}_h$ at step S110. Each node may calculate $\text{HEADER}_{hash_{h-1}}$, which is the result of hashing the header of a previous block, at step S120.

If the result of $\text{HASH}(\text{HEADER}_h, \text{NONCE}_h) < \text{DIFFICULTY}_h$ is TRUE, a node may be determined to have permission to generate a new block at step S130. In order to select distributed consensus nodes for every height of a blockchain with the probability p, the expression, $\text{HASH}(\text{HEADER}_h, \text{NONCE}_h) < \text{DIFFICULTY}_h$, may be used. Here, $\text{HASH}(\text{HEADER}_h, \text{NONCE}_h)$ is the value acquired by hashing $\text{HEADER}_{hash_{h-1}}$ and $\text{NONCE}_h$. Also, $\text{HEADER}_{hash_{h-1}}$ is the hash value of the header of the block, the height of which is h−1. Therefore, none of the nodes may know whether they are selected as distributed consensus nodes for the block, the height of which is h, until the block, the height of which is h−1, is added to the blockchain. Here, $\text{NONCE}_h$ is a nonce value for the block, the height of which is h. Here, $\text{NONCE}_h$ is different in individual nodes, and may be acquired using a nonce chain, which will be described below.

When a nonce chain is used, a node cannot arbitrarily alter a nonce value. Accordingly, the node is not able to attempt to become a distributed consensus node using the computational capability thereof, as in bitcoin. Also, because the nonce value of each node is not predictable by other nodes, it is impossible for a malicious node to predict a distributed consensus node and to attack the same. Also, the validity of the nonce value disclosed by anode may be verified by other nodes. Here, DIFFICULTY$_h$ is the same value used by all of the nodes for the height 'h' in order to assign permission to participate in the distributed consensus only to the minimum number of nodes required for distributed consensus.

Then, the node that obtains permission to generate a new block may disclose NONCE$_h$ used by itself, the height of the block, and the address of the node at step S140.

In the method for selecting consensus nodes based on PoN according to an embodiment of the present invention, in order to select entities performing distributed consensus for a block, the height of which is h, in an unpredictable manner, an operation is performed on information about a previous block, the height of which is h−1, and information acquired from a nonce chain, and the result of the operation is compared with a specific reference value, whereby nodes may be selected with the probability p.

In an embodiment, in order to prevent all of the nodes from predicting entities performing distributed consensus for a block to be linked to a previous block before the previous block is generated, information related to the previous block may be used in order to determine the entities performing distributed consensus.

In an embodiment, the opportunity for calculation, through which a node is selected as an entity performing distributed consensus, is given to all of the nodes only once for each height. To this end, a value retrieved from a nonce chain may be used as a nonce for a hash function.

In an embodiment, assuming that the number of nodes that are able to participate in consensus is n, that the minimum number of nodes that are required for the consensus is x, and that the probability that the number of selected nodes is equal to or less than the minimum number of nodes required for the consensus is k, the number of entities performing distributed consensus, including these three variables (n, x, k), may be controlled.

In an embodiment, the probability that a certain node is selected has a binomial distribution through HASH (HEADER$_h$,NONCE$_h$)<DIFFICULTY$_h$. In an embodiment, the probability $p_{x,k}$, related to the three variables (n, x, k), is multiplied by the maximum value of HASH(HEADER$_h$, NONCE$_h$), whereby DIFFICULTY$_h$ may be calculated.

Figure 7:
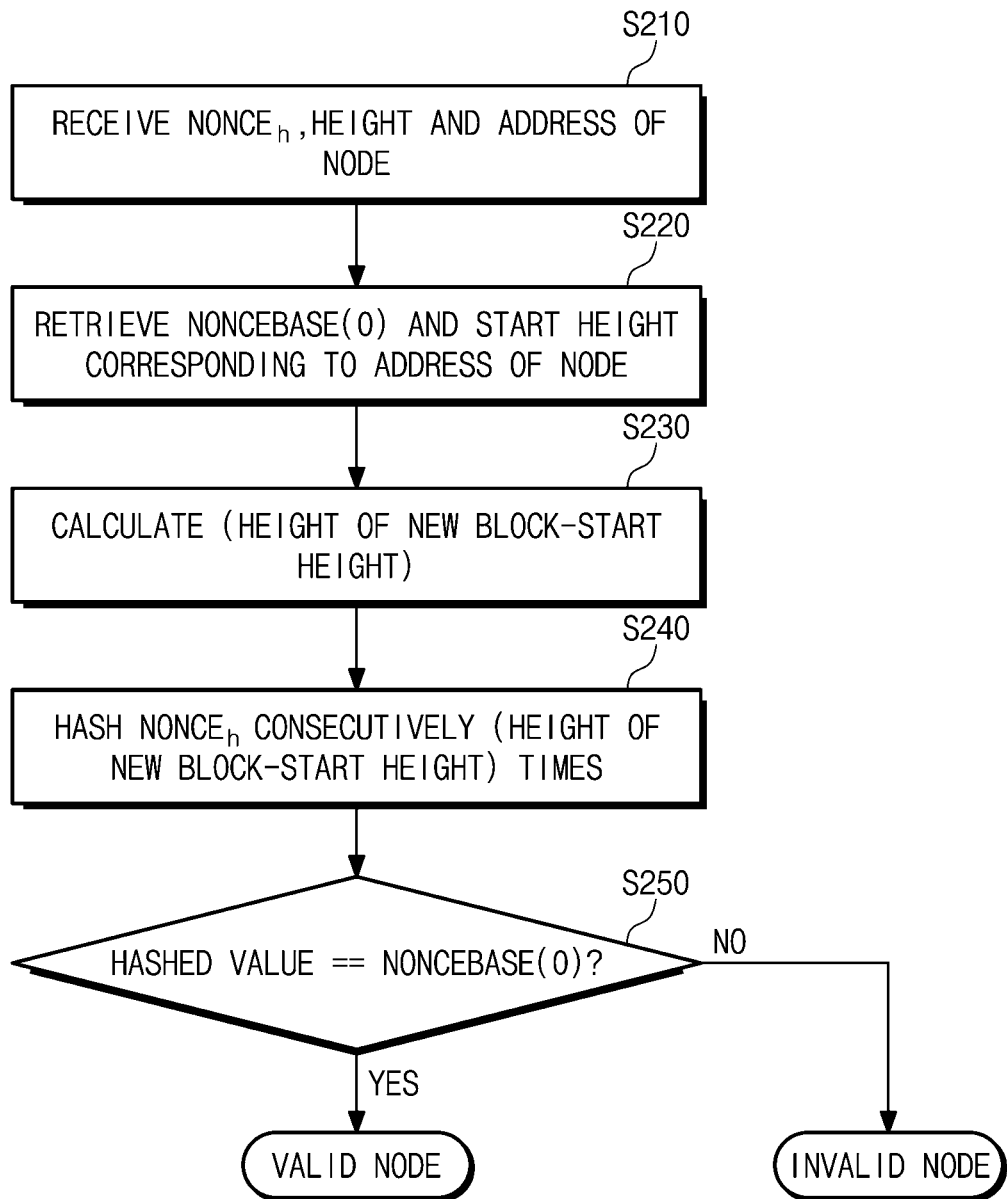
FIG. 7 is an exemplary view that shows a method for verifying whether a node selected to participate in distributed consensus is eligible to participate in the distributed consensus according to an embodiment of the present invention.

FIG. 7 is an exemplary view that shows a method for verifying the qualification of a node that participates in distributed consensus according to an embodiment of the present invention. Referring to FIG. 7, whether a node that discloses three types of information is eligible to generate a block may be verified by other nodes using the following method.

Other nodes, other than the node to generate a block, may receive the nonce value, the height information, and the address of the corresponding node at step S210. The other nodes may retrieve the value of NONCEBASE(0) and a start height using the address of the corresponding node at step S220.

The other nodes may calculate the difference between the height of the new block and the start height (that is, HEIGHT of NEW BLOCK-START HEIGHT) using the values disclosed by the node at step S230. Then, NONCE disclosed by the node is repeatedly hashed as many times as the difference between the height of the new block and the start height at step S240, and if the final hash value is equal to NONCE-BASE(0) at step S250, it may be verified that the node that disclosed information is eligible to generate a block. Conversely, if not, the node that disclosed the information is determined to be invalid. The node determined to be invalid may be demoted when it attempts to generate or use a block.

In the method for obtaining qualification for an entity performing distributed consensus in a distributed consensus algorithm based on PoN according to an embodiment of the present invention, the opportunity to determine whether a node is selected as an entity performing distributed consensus is given to each node only once for each height in order to prevent resources (e.g., computational capability) owned by the node from affecting the probability that the node obtains qualification for an entity performing the consensus.

In an embodiment, the number of opportunities to determine whether a node is selected as an entity performing consensus may be limited so as to be equal to or greater than once and equal to or less than m.

In an embodiment, because the node selected as an entity performing consensus discloses address information, through which the node itself can be identified, and a nonce and a start height, acquired from the nonce chain thereof, other nodes may verify whether the node is eligible to serve as an entity performing consensus. In an embodiment, anode determined to be invalid as the result of verification may be demoted.

Figure 8:
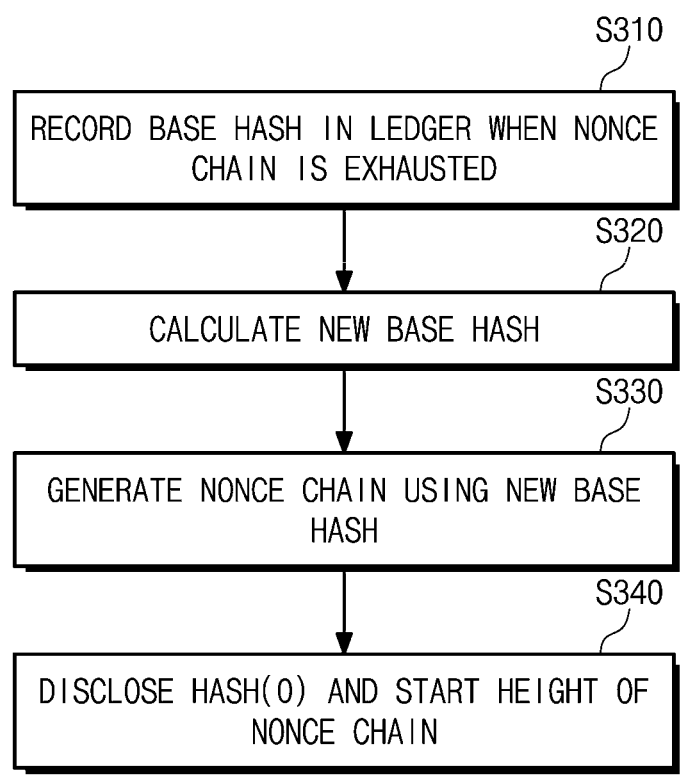
FIG. 8 is an exemplary view that shows a method for updating a nonce chain according to an embodiment of the present invention.

FIG. 8 is an exemplary view that shows a method for updating a nonce chain according to an embodiment of the present invention. Referring to FIG. 8, when a nonce chain is exhausted, the nonce chain may be updated as described below.

When a nonce chain is exhausted, the base hash value thereof is recorded in a ledger at step S310. Accordingly, whether or not the result of node selection made so far has any problem may be checked later. When a nonce chain is exhausted, a new base hash may be calculated at step S320. A nonce chain is generated from the new base hash at step S330, and the final hash value (HASH(0)) and the start height of the nonce chain are disclosed, whereby the nonce chain may be updated at step S340.

In an embodiment, when all of the values of a nonce chain, generated by a node, are exhausted, and at the same time, the update of the nonce chain is attempted, a node that succeeded in block generation forcibly generates a new nonce chain, whereby a congestion problem, which may be caused when all nodes attempt chain update, may be solved.

In an embodiment, because the node that succeeded in block generation updates a nonce chain, network congestion attributable to excessive traffic and overload of a node for processing update may be solved.

Meanwhile, the present invention may be applied in a distributed computing environment. For example, a distributed computing system, in which many unspecified nodes participate, may be configured such that a node generates a nonce chain to use based on a hash chain and discloses the start height and NONCE(0) of the nonce chain in advance so as to sequentially use the hash values in the nonce chain and such that other nodes perform verification based on the disclosed values.

The distributed computing system for generating a blockchain according to an embodiment of the present invention may include at least one first node and at least one second node. Here, the at least one first node generates a nonce chain based on a hash chain and discloses nonce chain information, including the start height and the nonce value of the nonce chain and the address thereof, to other nodes. The at least one second node verifies whether the at least one first node is eligible to serve as a consensus node using the nonce chain information, the nonce value, and the height received from the at least one first node.

In an embodiment, when the at least one first node succeeds in block generation, the nonce chain may be updated. In an embodiment, the at least one second node may further include an elite pool in which nonce chain information is registered. In an embodiment, the at least one first node withdraws from the elite pool, thereby dropping out of consensus. In an embodiment, in order to register the at least one first node in the elite pool, a transaction record in a blockchain may be used.

Meanwhile, difficulty will be described below. The difficulty may be related to the probability that a node is selected. Specifically, "the probability that a node is selected is decreased" may have the same meaning as "increased difficulty".

Participating nodes may determine whether they are selected as entities performing distributed consensus using HASH(HEADER$_h$,NONCE$_h$)<DIFFICULTY$_h$. Here, when the difficulty value DIFFICULTY', is excessively large, a large number of nodes is selected as entities performing distributed consensus, whereby network traffic may be increased and consensus may be time-consuming. Conversely, when the difficulty value is excessively small, the probability that nodes are selected as entities performing distributed consensus becomes very low. Accordingly, the number of selected nodes may become smaller than the minimum number of nodes required for distributed consensus, so distributed consensus may become impossible. Therefore, it is necessary to set the difficulty to a suitable value such that the number of nodes for distributed consensus is controllable.

The method for setting the probability p for controlling the number of nodes for distributed consensus is as follows. A single random value is selected, and a result of comparison of the random value with a certain reference value is determined to be 'pass' or 'fail', which corresponds to a Bernoulli trial with a success probability p.

In the expression HASH(HEADER$_h$,NONCE$_h$)<DIFFICULTY$_h$, which is used in order to select entities performing distributed consensus, the left side thereof becomes a single random value acquired as the result of a hash function, and the right side thereof is a certain reference value, that is, difficulty. When an event in which a node is selected as an entity performing distributed consensus as the result of comparison of the random value with the reference value is represented as 'pass' and when an event in which anode is not selected as an entity performing distributed consensus is represented as 'fail', the result of the above expression corresponds to a Bernoulli trial with a success probability of p. When a Bernoulli trial with a success probability of p is conducted n times, if the number of times that the result is success is x, a cumulative distribution function is represented as shown in the following equation.

$$F_x(x) = \frac{1}{2}\left(1 + \text{erf}\frac{x-\mu}{\sigma\sqrt{2}}\right) \quad (14)$$

In order to successfully reach agreement between distributed nodes, it is required to probabilistically set the minimum number of nodes. To this end, the minimum number of nodes, x, and the probability that the number of selected nodes is equal to or less than the minimum number, $F_x(x)$, may be selected. Here, if this probability value is k, the probability p may be calculated.

With regard to x and k, which are the minimum number of nodes required for consensus and the probability that the number of selected nodes is equal to or less than the minimum number, respectively, $p_{x,k}$ may be represented as shown in the following equation.

$$p_{x,k} = \frac{x + (\text{erf}^{-1}(2k-1))^2 + \sqrt{(x+(\text{erf}^{-1}(2k-1))^2)^2 - \left(\frac{2(\text{erf}^{-1}(2k-1))^2}{n}+1\right)x^2}}{2(\text{erf}^{-1}(2k-1))^2 + n} \quad (15)$$

Here, n denotes the number of nodes registered in an elite pool, x denotes the minimum number of nodes required for consensus, and k denotes the cumulative probability that the number of selected nodes is equal to or less than x. Here, $p_{x,k}$ may be determined using the three variables n, x and k.

Here, in order to set the probability that a node is selected as an entity performing distributed consensus to $p_{x,k}$, DIFFICULTY$_h$ may be set to a value acquired by multiplying the maximum value of HASH(HEADER$_h$,NONCE$_h$) by $p_{x,k}$. Here, if the maximum value is substituted with MAX$_{slice}$, DIFFICULTY$_h$ may be set as shown in the following equation. For example, when only 32 bits of a hash result are used for the equation, MAX$_{slice}$ may be 232.

DIFFICULTY=$p_{x,k}$×MAX$_{slice}$

When the number of nodes registered in the elite pool disclosed to nodes is changed, DIFFICULTY$_h$ may be newly calculated.

Meanwhile, in the system operating with the probability $p_{x,k}$ that satisfies the above-described difficulty, it is improbable that x in the cumulative distribution function $F_x(x)$ is half of the mean, μ/2; that is, the probability that the number of selected nodes is equal to or less than μ/2 is very low. Therefore, when the number of nodes selected as entities performing distributed consensus is equal to or less than a certain number, e.g., μ/2 or the like, or when such an event successively occurs two or more times, partitioning of a network or aliveness of nodes may be checked. Meanwhile, it should be understood that it is not necessary to limit the reference value for difficulty to half of the mean in a probability distribution function, that is, μ/2. In the present invention, the reference value for difficulty may be any value related to the mean of a probability distribution function.

Figure 9:
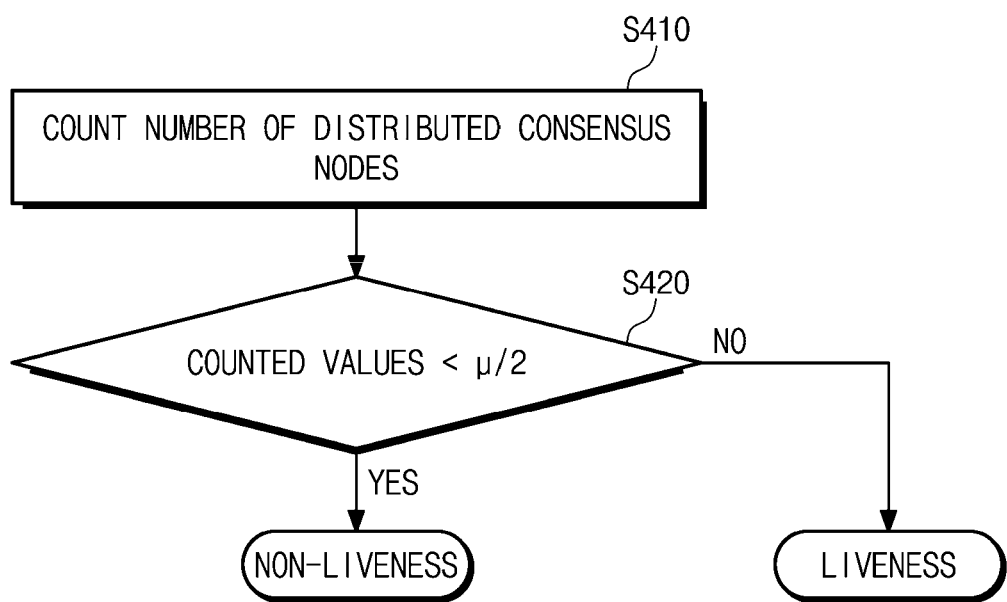
FIG. 9 is an exemplary view that shows a method for checking the live state of a node according to an embodiment of the present invention.

FIG. 9 is an exemplary view that shows a method for checking the aliveness of a node according to an embodiment of the present invention. Referring to FIG. 9, the method for checking the aliveness of a node is as follows. The number of nodes selected as distributed consensus nodes may be counted at step S410. Whether the counted number is less than a certain number (e.g., μ/2) may be checked at step S420. If the counted number is less than the certain number, the aliveness of nodes is not guaranteed in the consensus node algorithm. Conversely, if the counted number is equal to or greater than the certain number, the aliveness of nodes may be guaranteed in the consensus node algorithm.

Through the method for checking the aliveness of a node in the consensus node algorithm based on PoN according to an embodiment of the present invention, problems such as partitioning of a network, deactivation of nodes, and the like may be detected in real time based on the number of nodes selected as entities performing consensus.

Figure 10:
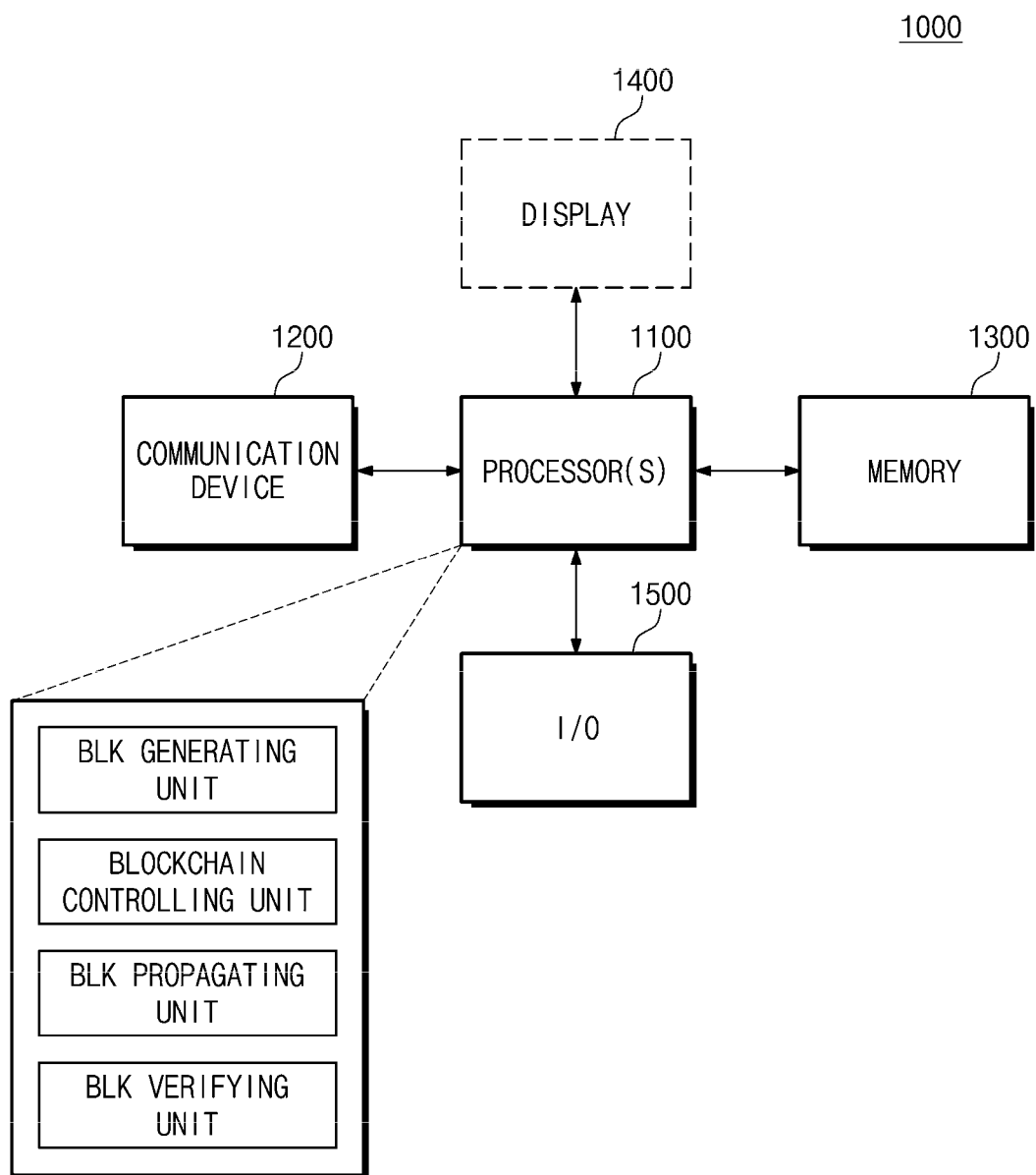
FIG. 10 is an exemplary view that shows an apparatus for generating a blockchain according to an embodiment of the present invention.

FIG. 10 is an exemplary view that shows an apparatus for generating a blockchain according to an embodiment of the present invention. Referring to FIG. 10, the apparatus 1000 for generating a blockchain may include at least one processor 1100, a network interface 1200, memory 1300, a display 1400, and input/output devices 1500.

The processor 1100 may include at least one of the devices described with reference to FIGS. 1 to 9, or may be implemented using at least one of the methods described with reference to FIGS. 1 to 9. The processor 1100 may execute instructions in order to generate a nonce chain based on a hash chain, disclose the start height and the nonce value of the nonce chain and nonce chain information including the address of a node to other nodes or in order to verify whether the node is eligible to serve as a consensus node using the nonce chain information and the nonce value and the height, which are received from the corresponding node.

The processor 1100 may run programs and control the apparatus 1000 for generating a blockchain. The apparatus 1000 for generating a blockchain may be connected with an external device (e.g., a personal computer or a network) and exchange data therewith via the I/O devices 1500. The apparatus 1000 for generating a blockchain may be any of various types of electronic systems, including mobile devices such as a mobile phone, a smartphone, a PDA, a tablet PC, a laptop, and the like, computing devices such as a PC, a tablet PC, a netbook, and the like, and electronic devices such as a TV, a smart TV, a security device for gate control, and the like.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or nonvolatile memory. The memory 1300 may include a storage device in order to store user's data. The storage device may be an embedded multimedia card (eMMC), a solid-state drive (SSD), universal flash storage (UFS), or the like. The storage device may include at least one nonvolatile memory device. The nonvolatile memory device may be any one of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, and any other device capable of executing instructions and responding thereto. The processing device may run an operating system (OS) and one or more software applications executed on the OS.

Also, the processing device may access, store, manipulate, process, and create data in response to the execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The apparatus 1000 for generating a blockchain according to an embodiment of the present invention includes at least one processor 1100 and memory 1300 for storing at least one instruction executed by the at least one processor 1100. The at least one instruction may be executed by the at least one processor 1100 so as to read a nonce from the nonce chain of a node, to calculate the read nonce and previous height information, and to compare the calculated value with a reference value in order to select the node as a consensus node.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured such that it operates as one or more software modules in order to perform the operations of the embodiment, and vice-versa.

The present invention may prevent prediction of nodes to participate in distributed consensus, thereby preventing a malicious node from predicting and attacking the nodes.

Also, because the present invention assigns permission to participate in distributed consensus to the minimum number of nodes required for the distributed consensus, among all nodes, fast agreement therebetween may be achieved.

Also, the present invention enables nodes to obtain permission to participate in distributed consensus regardless of the computational capabilities thereof, whereby some nodes having high computational capabilities may be prevented from obtaining exclusive permission to participate in the distributed consensus.

Also, the present invention may verify nodes to participate in distributed consensus, thereby preventing disqualified nodes from participating in the distributed consensus.

Meanwhile, the nonce chain of each node is used in order to select or verify consensus nodes, as described above. The nonce chain may be used in order to assign nodes to an arbitrary shard and to select at least the minimum number of nodes from each shard such that the selected nodes serve as entities performing distributed consensus.

The method and apparatus for selecting distributed consensus nodes based on proof of nonce according to an embodiment of the present invention make it impossible to predict nodes to participate in distributed consensus, whereby a malicious node is prevented from predicting and attacking the nodes to participate in distributed consensus.

The method and apparatus for selecting distributed consensus nodes based on proof of nonce according to an embodiment of the present invention enable only the minimum number of nodes required for distributed consensus, among all nodes, to obtain permission to participate in distributed consensus, whereby an agreement is quickly reached between the nodes participating in distributed consensus.

The method and apparatus for selecting distributed consensus nodes based on proof of nonce according to an embodiment of the present invention enable nodes to obtain permission to participate in distributed consensus regardless of the computational capabilities thereof, thereby preventing a small number of nodes having high computational capabilities from obtaining exclusive opportunities to participate in distributed consensus.

The method and apparatus for selecting distributed consensus nodes based on proof of nonce according to an embodiment of the present invention may verify that the nodes selected to participate in distributed consensus are eligible to participate in the distributed consensus, thereby preventing disqualified nodes from participating in the distributed consensus.

Meanwhile, the above description is merely specific embodiments for practicing the present invention. The present invention encompasses not only concrete and available means but also the technical spirit corresponding to abstract and conceptual ideas that may be used as future technology.

What is claimed is:

1. A method for verifying a consensus node in an apparatus for generating a blockchain, comprising:
    receiving a nonce value, a height of a new block, and identify information of a first node from the first node, wherein the first node is selected as the consensus node;
    retrieving a final nonce value and a start height of the first node from an elite pool of a second node using the identity information of the first node, the elite pool storing final nonce values and start heights of a plurality of nodes including the first node;
    subtracting the start height from the height of the new block;
    hashing the nonce value as many times as a result of the subtraction; and
    comparing a result of the hashing with the final nonce value in order to verify whether the first node is eligible to serve as the consensus node.

2. The method of claim 1, wherein, when the result of hashing is equal to the final nonce value, a block generation permission of the first node is verified.

3. The method of claim 1, wherein, when the result of hashing is not equal to the final nonce value, the first node is demoted when generating a block or using the blockchain.

* * * * *